United States Patent [19]
Elliott

[11] 3,862,695
[45] Jan. 28, 1975

[54] PIANO LOADING TRAILER

[76] Inventor: Carl E. Elliott, 716 S. Capitol Ave., Indianapolis, Ind. 46225

[22] Filed: May 8, 1974

[21] Appl. No.: 467,862

[52] U.S. Cl. ............... 214/374, 214/370, 214/500, 280/47.12, 280/400
[51] Int. Cl. .............................................. B60p 1/04
[58] Field of Search .................... 280/400, 47.12; 214/370–384, 500

[56] References Cited
UNITED STATES PATENTS

| | | | |
|---|---|---|---|
| 1,866,887 | 7/1932 | Gleason et al. | 280/47.12 |
| 2,346,649 | 4/1944 | Bilek et al. | 214/383 |
| 3,251,497 | 5/1966 | Simas | 214/515 |
| 3,421,644 | 1/1969 | Butcher | 214/500 |

FOREIGN PATENTS OR APPLICATIONS

| | | | |
|---|---|---|---|
| 1,040,970 | 9/1966 | Great Britain | 280/400 |

Primary Examiner—Leo Friaglia
Attorney, Agent, or Firm—William R. Coffey

[57] ABSTRACT

For pulling with a conventional road vehicle such as a car or pickup truck, a trailer comprising a frame providing a horizontally extending bed having a rear edge portion and forward edge portion, a pair of ground engaging wheels for supporting the frame, a tongue extending forwardly from the frame, and a rocker assembly mounted on the rear edge portion of the frame. The rocker assembly includes at least one arcuate rocker which, in its use position, extends arcuately downwardly from the rear edge portion of the bed and forwardly toward the point of engagement of the wheels with the ground to support the bed for pivotal movement between its horizontal position and a vertical loading position.

8 Claims, 2 Drawing Figures

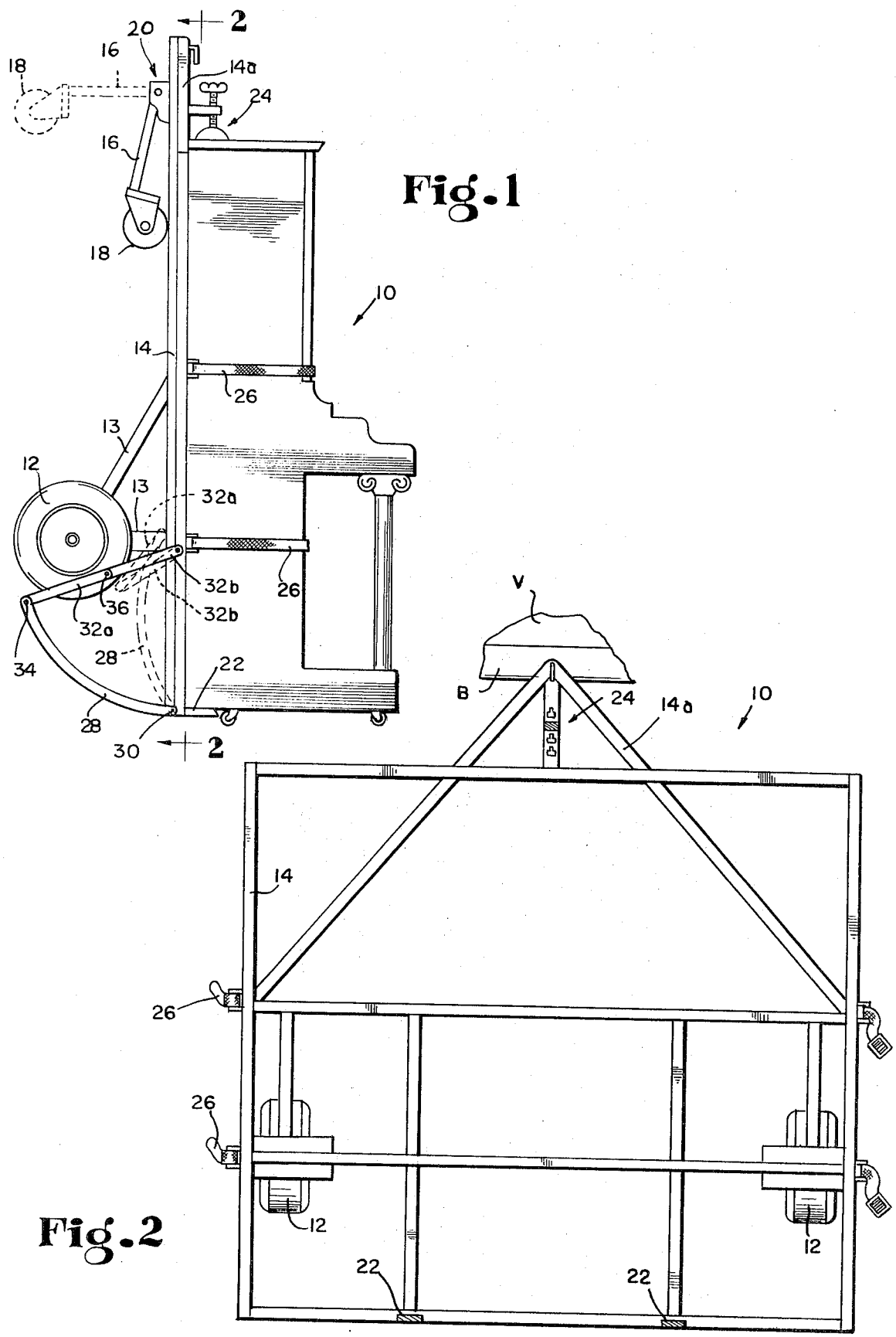

PIANO LOADING TRAILER

The present invention relates to vehicles or trailers, and more particularly to the provision of such a trailer which is provided with a rocker assembly at its rear end portion for use in pivotally supporting the trailer for movement between its horizontal pulling position and a vertical loading position.

It takes as many as six good strong men to pick up a piano and load it onto a truck or off a truck. It is my concept to provide a trailer which can be used to pull a piano or a heavy bulky load such as a piano behind an automobile or a truck, the trailer being proportioned and designed such that one person can use the trailer to pick up the load.

Others have offered hand trucks for picking up and moving loads around warehouses and the like, the hand trucks comprising frames with built-in rocker portions. Representative prior art showing such structures include U.S. Pat. Nos. 1,137,993 issued May 4, 1915; 1,185,615 issued June 6, 1916; 1,201,957 issued Oct. 17, 1916; 1,542,327 issued June 16, 1925; 1,738,096 issued Dec. 3, 1929; 1,866,887 issued July 12, 1932; 2,417,553 issued Mar. 18, 1947; and 2,421,123 issued May 27, 1947. People who work with pianos have such hand trucks which will permit one man to pick up and move a piano about a warehouse.

It is my concept to provide a trailer which may be pulled upon a road or highway behind a vehicle and which includes a retractable rocker assembly or assemblies for use in picking up a piano or other such heavy and bulky load. My trailer will have conventional road vehicle wheels for movably supporting the trailer frame, a tongue for connecting the trailer to the pulling vehicle, and even a tongue support for supporting the trailer in its horizontal position when it is disconnected from the vehicle.

It is a primary object of my invention, therefore, to provide such a trailer including a rocker assembly mounted on the rear edge portion of the trailer frame, the rocker assembly including at least one arcuate rocker having an extended use position and a retracted storage position. Each said rocker, in its use position, extends arcuately downwardly from the rear edge portion of the trailer bed and forwardly toward the point of engagement of the wheels with the ground. Means are provided for holding each rocker alternately in its use and storage positions. The rockers are disposed, in their use positions, to support the trailer bed for pivotal movement between its horizontal pulling position and its vertical loading position.

The subject of this patent application is included in my Disclosure Document No. 27,513 filed Jan. 17, 1974.

Other objects and features of my present invention will become apparent as this description progresses.

To the accomplishment of the above and related objects, this invention may be embodied in the form illustrated in the accompanying drawings, attention being called to the fact, however, that the drawings are illustrative only, and that change may be made in the specific construction illustrated and described, so long as the scope of the appended claims is not violated.

In the drawings:

FIG. 1 shows an elevational view of my trailer with a piano loaded thereagainst, the trailer being in its vertical position; and FIG. 2 shows a plan view of my trailer looking generally along the lines 2—2 in FIG. 1.

Referring now particularly to the drawings, it will be seen that the trailer, indicated generally by the reference numeral 10, includes a pair of coaxially spaced apart road engaging wheels 12 and means 13 supporting a frame 14 upon the wheels. Any number of different types of conventional means may be used for supporting the frame 14 upon the wheels 12. For instance, conventional leaf springs or other such devices may be used to support the frame upon the wheels.

A portion 14a of the frame provides a tongue, and I use a tongue support 16 with a caster 18 on its distal end to support the frame 14 in its horizontally extending position when it is not connected to a vehicle. The support 16 may be pivotally connected to the tongue portion 14a as indicated at 20 for movement between its downwardly extending supporting position and its retracted position shown in solid lines in FIG. 1.

I provide one or more vertically upwardly extending flange means 22 extending transversely along the rear edge portion of the frame 14. When the frame 14 is tilted upwardly to its load receiving position, of course, these flange means 22 extend under and engage a load. I then provide clamp means such as indicated generally at 24 for engaging the load and holding it against the flange means 22. Additionally, strap means as indicated at 26 may be used securely to hold the load against the bed of the trailer.

In order to facilitate moving the frame 14 between its horizontally extending position and its vertically extending position, particularly when it is loaded, I provide a rocker assembly mounted on the rear edge portion of the frame 14. The illustrative rocker assembly includes, at each side of the frame 14, at least one arcuate rocker 28 having an extended use position shown in solid lines in FIG. 1 and a retracted storage position shown in dashed lines in FIG. 1. Each said rocker 28, in its use position, extends arcuately downwardly from the rear edge portion of the frame 14 and forwardly generally toward the point of engagement of the wheels 12 with the ground. Means are provided for holding each rocker 28 alternately in its use and storage positions. The illustrative holding means includes linkage means 32a, 32b. When the linkage means 32a, 32b are extended, the rocker 28 is held in its use position. When the linkage means is folded, the rocker 28 is elevated to its storage position. In the illustrative embodiment, the linkage means includes two rigid links, the lower one of which is pivotally connected to the distal end of the rocker 28 as indicated at 34 and pivotally connected to the upper one as indicated at 36. The upper one is in turn pivotally connected to the frame as indicated at 38. Conventional means, not shown in the drawings, may be used for locking the rigid links 32a, 32b in their solid-line position shown in FIG. 1. For instance, the upper portion of the link 32a may be provided with an abutment portion for engaging the lower portion of the link 32b to prevent further counterclockwise motion of the link 32a about the pivot point 36. Such an abutment would permit the link 32a to swing clockwise about the pivot point 36 when the rocker 28 swings upwardly to its storage position. Various types of locking pins could be used to lock the rigid links 32a, 32b in their solid-line position shown in FIG. 1.

By placing the rockers 28, one rocker on each side of the frame 14, in their use positions, I can easily tilt the frame 14 from its horizontal position to its vertical position and then back to its horizontal position, even when the trailer is loaded with a heavy bulky load such as the illustrated piano. By having the rockers 28 extend arcuately from the rear edge portion of the frame 14 to the point at which the wheels 12 engage the ground, the rockers pivotally support the frame 14 for such movement.

In summary, my invention comprises a trailer which can be pulled behind a conventional vehicle and which is equipped with lifting rockers or runners which will engage the pavement or ground such that the trailer can be tilted upwardly to a vertical position to receive a load, tilted downwardly to a horizontal position for movement behind a vehicle, and then tilted upwardly to discharge the load.

In FIG. 2, I show a fragmentary portion of a vehicle V with a bumper B carrying a conventional trailer connector to which the tongue 14a is connected.

I claim:

1. For pulling with a conventional road vehicle, a trailer comprising a frame providing a horizontally extending bed having a rear edge portion and forward edge portion, a pair of ground engaging wheels for supporting said frame, said wheels being coaxially disposed intermediate the end portions of said frame, a tongue extending forwardly from said frame to connect with such a vehicle, and a rocker assembly mounted on the rear edge portion of said frame, said rocker assembly including at least one arcuate rocker having an extended use position and a retracted storage position, each said rocker, in its use position, extending arcuately downwardly from the rear edge portion of said bed and forwardly toward the points of engagement of said wheels with the ground, and means for holding each rocker alternately in its use and storage positions, said rockers being disposed, in their use positions, to support said frame bed for pivotal movement between its said horizontal position and a vertical position.

2. The trailer of claim 1 including lifting flange means extending transversely along and generally vertically upwardly from the rear edge portion of said frame bed in its horizontal position, said flange means being disposed to extend under and engage a load when said bed is in its vertical position.

3. The trailer of claim 2 including clamping means on the forward edge portion of said bed to engage a load and hold it against said lifting flange means.

4. The trailer of claim 3 including strap means for holding the load against said bed.

5. The trailer of claim 1 including ground engaging means for supporting said tongue when said bed is in its said horizontal position, said supporting means being movable between its ground engaging position and a retracted storage position.

6. The trailer of claim 3 including ground engaging means for supporting said tongue when said bed is in its said horizontal position, said supporting means being movable between its ground engaging position and a retracted storage position.

7. The trailer of claim 1 including means for connecting the proximal end of each rocker to said rear edge portion for pivotal movement between its use and storage positions.

8. The trailer of claim 7 in which said holding means includes linkage means for connecting the distal end of each rocker to said frame, said linkage means being foldable to retract said rocker.

* * * * *